3,429,750
PROCESS FOR PREPARING AN IMPROVED
PLATINUM ELECTRODE
Robert F. Waters, Hammond, Ind., assignor to Standard
Oil Company, Chicago, Ill., a corporation of Indiana
No Drawing. Filed July 31, 1963, Ser. No. 299,065
U.S. Cl. 136—120          8 Claims
Int. Cl. H01m 27/10

This invention relates to electrochemical cells and more particularly it relates to fuel cells employing novel platinum electrodes which have increased surface areas and improved performance.

Fuel cells adapted for producing electrical energy directly from chemical fuels are well known (see "Fuel Cells," edited by G. J. Young, Reinhold Publishing Corporation, New York, N.Y., 1960). In general, fuel cells are electrochemical devices which convert the chemical energy of a fuel directly into electrical energy by the oxidation of fuel supplied to the cell.

Typically, gaseous fuel such as hydrogen, carbon monoxide, alcohol, propane, and other hydrocarbon or hydrocarbon-derived fuel is supplied to one of the electrodes. Liquid fuels may also be employed, such as the liquid alcohols. An oxidant such as oxygen or air is supplied to the other electrode. Usually these electrodes have a catalytic agent on their surface to promote the formation of electrons at the fuel electrode and the consumption of electrons at the oxidant electrode, with the electrolyte providing a medium for the ionic transportation of an electrical charge between electrodes. For example, a fuel such as methane when fed to a fuel electrode will form electrons and products of oxidation. Oxygen, as the oxidant, when fed to the other electrode will take up electrons and form reduction products, leaving the electrode charge with a positive value. The electrolyte, commonly an acidic or alkaline type, is the medium by which the ionic transfer of the electrical charges takes place. The resultant electrical charges on the individual electrodes furnish an electrical current for an external circuit.

The overall efficiency of a fuel cell is directly related to the promotion effect of the catalytic agent on the individual electrodes. The greater the activity of the catalytic agent, the smaller the energy loss required to promote the formation of the electrons at the fuel electrode and the consumption of the electrons at the oxidant electrode. By reducing the amount of this energy loss in the cell, the efficiency and output of the cell are naturally increased.

In the past, platinum has been found very desirable as a catalytic agent for electrodes in a fuel cell employing a hydrocarbon or a hydrocarbon-derived fuel, and an oxidant. Generally, the platinum is placed on an electrode support, usually electrically conducting such as porous carbon, to increase its surface area and to minimize the cost of the electrode.

However, the present platinum electrodes are not entirely satisfactory in that excessive voltages are required to promote the desired reactions at the fuel and oxidant electrodes. If this activation voltage (or activation polarization as it is sometimes known) could be reduced, it would improve the efficiency of the cell and result in a more practical fuel cell.

An object of this invention is the reduction of the activation polarization of a platinum electrode in a fuel cell. Another object is the improvement in the operation of a fuel cell. Other objects will become apparent from the detailed description of the invention.

It has been discovered that the activation polarization of a platinum electrode is materially reduced when a second metal is introduced into the platinum, the second metal being converted by heat to an intimate mixture with the platinum, and at least a portion of the second metal removed from the electrode. The result is an electrode containing the intimate mixture of platinum and the second metal having an increased surface area, due to the removal step. The increased internal surface area exposes an increased amount of the intimate mixture to the fuel or oxidant which results in a reduced activation polarization. Another benefit is the increased electrical currents which can be withdrawn from the cell at particular voltages. It has also been discovered that the intimate mixture is produced by (1) heating a codispersion of platinum and the second metal on an electrode support to a high temperature in an inert atmosphere for sufficient time to produce the intimate mixture, and (2) removing at least a portion of the second metal to produce the increased internal surface area and expose increased amounts of the intimate mixture in the electrode. The second metal is a transition metal having an atomic number of about 22–76, such as iron.

Briefly, the invention concerns an electrode suitable for a fuel cell comprising an electrode support, a platinum layer on the support, the layer comprising platinum, and an intimate mixture of platinum and a second metal, the second metal being a transition metal having an atomic number of about 22–76, the platinum layer having a plurality of internal exposed surface areas, each surface area partially encompassing a void, and at least a portion of the intimate mixture being exposed on the surface areas. Surprisingly, the electrode exhibits reduced activation polarization and improved useful voltages. The invention also concerns the fuel cell utilizing this electrode and a particular process for preparing the electrode.

The electrode includes an electrode support which is usually electrically conductive. Generally, the purpose of the support is to provide a large surface area for the catalytic agent; and, therefore, the form of the support is normally a finely divided material or a porous material, such as porous metal or carbon. The latter is generally described in copending application Ser. No. 133,228, filed Aug. 22, 1961.

The electrode also includes a planitum layer on the support (about 0.1–10 wt. percent Pt and preferably about 0.5–10 wt. percent). The layer comprises platinum in an intimate mixture with a second metal. When a porous support is utilized, such as porous carbon, the platinum layer is naturally on the surfaces of the pores of the support and also on its external surfaces. The platinum layer has a plurality of internal exposed surface areas, each of which partially encompasses a void. The surface areas resulting from the formation of these voids expose at least a portion of the intimate mixture of platinum and the second metal to the fuel or oxidant. As will be discussed later, the process of producing these voids and the intimate mixtures results in a highly desirable platinum layer and thus a highly desirable electrode. The electrode therefore, may be thought of as one having an increased surface area with exposed portions of the intimate mixture. Generally, the second metal has an atomic number in the order of about 22 and higher, commonly about 22–76, and probably those transition metals having an atomic number of about 22–29. Suitable metals include vanadium, chromium, manganese, iron, cobalt, nickel, copper, molybdenum, silver and the like, and especially vanadium, chromium, manganese, iron, cobalt, nickel and copper, and mixtures thereof, such as iron and nickel; and manganese, nickel and copper. The improved electrode includes the second metal in the platinum layer in the form of an intimate mixture. The intimate mixture is intended to describe an association of the platinum and the second metal. This association is a combination of highly divided particles of the second metal with the platinum and includes various stages of alloy formation with the platinum.

The intimate mixture contains the second metal (including mixture thereof) in amounts ranging from very small to substantial, based on the platinum in the electrode. This amount is in the order of about 2 to about 300 atomic percent (about 0.5 to about 86 wt. percent for iron), based on platinum although preferably about 4 to about 100 atomic percent.

A particularly desirable process for producing this electrode comprises (1) treating a codispersion of platinum and a second metal on the defined electrode support to a high temperature in an inert atmosphere for a sufficient time to produce the intimate mixture, and (2) removing at least some of the second metal from the platinum layer to produce an increased internal surface area in the platinum layer, which exposes increased amounts of the intimate mixture. Without the high temperature treatment and the removal step, the electrode does not exhibit the surprising results.

The codispersion of platinum and the second metal is intended to describe a physical relationship of the two metals, usually in a moderately divided state. Usually the codispersion is prepared by impregnating the support with salts of platinum and the second metal and then reducing the salts to their metallic form. However, the platinum and the second metal in their metallic form may be directly applied to the electrode support.

The high temperature defines a condition where the intimate mixture is formed. This temperature may range from about 150° C. (particularly for platinum black) to about 2,000° C., and preferably from about 500° C. to about 1500° C. A temperature in the order of about 1,000° C. is especially preferred because of the highly desirable results produced at this temperature and the convenience of the temperature. The heating step is carried out for a sufficient time to produce the intimate mixture. Typically, at 1000° C. this time is from about 1 minute to about 8 hours, depending on the amount of the intimate mixture desired. Times in the order of 2 hours are generally preferred, particularly with concentrations of second metal of 50 wt. percent or more (based on platinum), because of the very satisfactory conversion of the second metal to the intimate mixture.

As discussed in principle previously, the amount of the second metal in the codispersion is naturally a greater amount than that in the resulting intimate mixture, since part of the second metal is later removed. As stated above, the intimate mixture contains amounts up to about 300 atomic percent of the second metal based on the platinum. Therefore, the codispersion contains the second metal in amounts above the 300 atomic percent. For convenience, these amounts may be considered on the basis of weight percentage, since their formulation would normally be carried out on such a basis. The codispersion, therefore, has amounts of a second metal ranging from about 1 weight percent to about 1000 weight percent, although from about 5 weight percent to about 500 weight percent of the second metal based on the platinum is usually preferred.

The codispersion is treated at the high temperature in an inert atmosphere to prevent the oxidation of the metals. Nitrogen or argon provide a very suitable inert atmosphere.

After the treating step, the platinum layer on the electrode contains the intimate mixture. The next treatment is that of removing at least some of the second metal to produce internal voids in the platinum layer. These voids provide an increased internal surface area in the platinum layer which exposes increased amounts of the intimate mixture. The removal may be carried out by thermal, chemical or other known treatments. Chemical leaching, oxidation, and displacement are suitable methods for the removal of at least some of the second metal. In some instances, amalgams may be utilized to remove the desired portion of the second metal. Chemical leaching is generally preferred because of the simplicity of the treatment, and because of the large number of voids produced in the platinum layer.

In the removal step, an oxidizing chemical, such as sulfuric acid, is very desirable, since it serves to oxidize the desired portion of the second metal and remove the oxidized metal. The metals will either displace hydrogen or form an oxidation product from the oxidizing chemical. Nitric acid is also very suitable, especially with copper.

As stated above, the codispersion of platinum and the second metal may be produced by impregnating the suitable support with salts of platinum and a second metal to produce a codispersion of the salts. The salts are then subject to reducing conditions for a sufficient time to reduce at least a portion of each salt to its metallic form and to produce a reduction product. This reduction product represents the metals plus some or none of the salt. The reducing conditions may be thermal or chemical, depending on the starting salt. The thermal reduction may be carried out when utilizing the metallic salts of the organic acids, such as citrates, formates, acetates, and the like. The thermal reduction conditions are similar to the treating step in which the intimate mixture is produced. Therefore, the thermally reducible salts may be utilized to directly produce the intimate mixture during the heating step. The reduction product is then subjected to the high temperature step to produce the intimate mixture and the removal of some of the second metal is then carried out.

The reduction of the salts to their metallic form may also be carried out at chemical reduction conditions (preferably in an inert atmosphere) for sufficient time to reduce at least a portion of each salt to the free metal and to produce the defined reduction product. The treatment at the high temperature is then carried out, after which the removal step is carried out.

Normally, the salts are impregnated onto the support in their water-soluble form. Such salts as acetates of nickel, cobalt, and manganese are very suitable. Copper nitrate or the acetate is also suitable. Other suitable salts are known or may easily be determined. Typically, the salts are impregnated onto the support, preferably a porous support, by filling the pores of the support with the solution and evaporating off water. The support may be treated with each salt separately or at the same time. It has been found very convenient for oxalic acid or some other suitable chemical reduction agent also to be added along with the salt solutions to treat the support. In this way, the chemical reducing agent is present in the impregnated support and the subsequent reduction may be carried out by simply heating, in the case of the oxalic acid treatment, the impregnated support in an inert atmosphere, such as nitrogen, at temperatures in the order of 160° C. to cause reduction of the salts to the metals.

The above process results in an electrode which is very suitable for a fuel cell. The fuel cell comprises two electrodes separated by and in direct contact with an electrolyte. At least one of the electrodes is the improved electrode described above.

The electrolyte may be any of the commonly employed electrolytes, such as the acidic and alkaline types. Examples of the acids are phosphoric, sulfuric, and the like. Examples of the alkaline agents are alkali hydroxides and carbonates, such as potassium hydroxide, potassium bicarbonate, potassium carbonate, and mixtures thereof. Other electrolytes commonly employed in high temperature cells may also be utilized.

An especially desirable fuel cell is one in which the cathode has a second metal in the form of copper-nickel-manganese in the intimate mixture, the anode having a second metal as nickel-iron as the second metal, and the support is porous carbon. Especially preferred is a cell utilizing a sulfuric acid paste, made up from 8–15 wt. percent of a silica gel (HS–5 Cab-O-Sil), 1–3 wt. percent of filter paper pulp, and a sulfuric acid solution, preferably containing about 30 weight percent of $H_2SO_4$.

Fuels for the fuel cell of this invention include those commonly utilized in the past. Alcohols, olefins, and saturated hydrocarbons are very suitable, preferably the olefins such as ethylene and propylene and the like; and especially the alcohols such as methanol, ethanol, and the like. Fuels may be gaseous or liquid. They may be directly introduced in their suitable form. The oxidant is commonly air or oxygen, preferably oxygen.

The following examples illustrate some of the preferred embodiments of the invention. These embodiments are intended for illustrative purposes only and not to limit or restrict the invention in any way.

EXAMPLE I

In the preparation of a platinum electrode containing an intimate mixture of platinum and iron, chloroplatinic acid and ferric oxalate solution together with oxalic acid (3/1 molar ratio to the chloroplatinic acid) were impregnated into about a 1-inch diameter by ¼ inch thick (approximate dimensions) disc of porous graphite. The weights of the chloroplatinic acid and ferric oxalate were calculated to give approximately 1 weight percent platinum and 5 weight percent iron relative to the graphite support. The impregnated graphite support was dried at about 110° C. and then heated overnight in nitrogen at approximately 160° C. to cause reduction of the salts to the metals. The disc was then heated in a Vycor tube furnace to 1000° C. in an atmosphere of nitrogen, held at approximately 1000° C. for about two hours and then cooled in nitrogen to around room temperature to produce an intimate mixture of platinum and iron. The disc was then leached with 5 weight percent $H_2SO_4$ for approximately 24 hours to remove most of the iron. The leaching solution was replaced several times by fresh acid and was kept warm during most of the leaching. The resulting electrode was then washed, dried and used as a fuel electrode (anode) in a test cell.

The cell was constructed of a stainless steel cylinder with individual cavities for a cartridge heater and the actual cell. The cathode (1.5 cm. sq. of $PbO_2$ from Atlas storage battery), electrolyte and anode were placed in the appropriate cell cavity and surrounded with Teflon rings. A tantalum disc served as the contact to the anode. The electrolyte was a sulfuric acid paste made up of 54 gm. of HS-5 Cab-O-Sil (Geoffrey Cabot, Inc.), 26 gm. of S and S No. 289 filter pulp, and about 300–305 ml. of a 30 weight percent aqueous solution of sulfuric acid. The fuel was 30 volume percent ethanol in 30 weight percent $H_2SO_4$ (3 parts by volume of ethanol and 7 parts by volume of 30 weight percent aqueous $H_2SO_4$). The temperature was about 55° C.

The cell was tested according to a procedure whereby its internal resistance (after the test) and its open circuit voltage were measured. When the open circuit voltage reached a steady maximum, increasing increments of current were drawn from the cell. Values of voltage and current for each increment were recorded. The results of the test are listed in Table I below, together with the corresponding results for platinum electrodes (control electrodes), without the iron but prepared in a similar fashion, except for the calcination and leaching steps. Voltages listed below represent the potentials for the cell minus the internal IR drop. The higher the values of the voltages, the lower the activation polarization for the anode and the better the anode.

TABLE I

| Current (ma./cm.$^2$) | Volts Fe–Pt vs. $PbO_2$ | (IR-Free) Control |
|---|---|---|
| 2 | 1.32 | 1.08 |
| 6 | 1.26 | 0.99 |
| 10 | 1.22 | 0.93 |
| 20 | 1.15 | 0.78 |
| 40 | 1.06 | 0.49 |

The electrode containing platinum and iron was analyzed for platinum and iron. It was found that the electrode contained 0.85 weight percent platinum and 0.074 weight percent iron. This would result in an atomic percent for iron in respect to platinum of about 30%.

The above results demonstrate the superior performance of the platinum electrode which contained iron in contrast to the electrode which contained only platinum. These results are also remarkable because without the heating step, the performance of the platinum electrode with the iron would not be so significantly improved. The superior performance of the electrode is illustrated at current values of 2 ma./cm.$^2$ where a voltage of 1.32 resulted as contrast to the much lower voltage of 1.08 for the control. At 6 ma./cm.$^2$ the platinum electrode with the iron resulted in a voltage of 1.26 as constrasted to the lower voltage of 0.99 for the control. The superior results also were evidenced at higher currents, as noted at 40 ma./cm.$^2$ where the platinum electrode with the iron resulted in a voltage of 1.06 as contrasted to 0.49 for the control. Obviously, the platinum electrode containing iron was much improved over the control.

EXAMPLE II

Other electrodes were prepared by the process of Example I, except that the metal solutions listed below were used in place of ferric oxalate, and the removal procedure was as indicated. The metal solutions were nickel acetate, cobalt acetate-tetrahydrate, manganese acetate·tetrahydrate, copper nitrate·trihydrate, and individual combinations of ferric oxalate, copper acetate·monohydrate, and cobalt acetate·tetrahydrate; ferric oxalate, nickel acetate·tetrahydrate and copper acetate·monohydrate; nickel acetate·tetrahydrate and manganese acetate·tetrahydrate; and copper acetate·monohydrate and ferric oxalate. The following data relate to the preparation of these electrodes. For the purposes of simplicity, the particular electrode containing platinum and the second metal will be referred to merely under the caption of the second metal.

| Second Metal | Pt Solution | Metal Solution | Removed With— |
|---|---|---|---|
| Nickel | 2.0 ml. $H_2Pt(NO_2)_2SO_4$ 0.086 g. oxalic acid | 0.775 g. of $Ni(C_2H_3O_2)_2 \cdot 4H_2O$ | 50 ml. successively of 5, 10, 15, 25, and 30 wt. percent $H_2SO_4$. |
| Cobalt | do | 0.773 g. of $Co(C_2H_3O_2) \cdot 4H_2O$ | 50 ml. successively of 5, 10, and 15 vol. percent $HNO_3$; then with 50 ml. of 30 wt. percent $H_2SO_4$. |
| Manganese | 1.7 ml. $H_2PtCl_6$ soln.+0.073 g. oxalic acid | 0.815 g. of $Mn(C_2H_3O_2) \cdot 4H_2O$ | 50 ml. of 5 wt. percent $H_2SO_4$, changed 6 times during 1 day. |
| Copper | 1.7 ml. $H_2PtCl_6$ soln. 0.331 g. oxalic acid | 4.25 ml. soln. with 0.164 g. of $Cu(NO_3)_2 \cdot 3H_2O$/ml. | 50 ml. of 5 vol. percent $HNO_3$, changed 6 times during 1 day. |
| Iron-Nickel | 2.0 ml. $H_2PtCl_6$ soln. 0.086 g. oxalic acid | 0.388 g. $Ni(C_2H_3O_2) \cdot 4H_2O$; 0.559 g. ferric oxalate. | 50 ml. of 1, 2, 5, 10, 20, and 30 wt. percent $H_2SO_4$. |
| Iron-Copper-Cobalt | do | 0.186 g. ferric oxalate; 0.174 g. $Cu(C_2H_3O_2) \cdot H_2O$; 0.258 g. $Co(C_2H_3O_2) \cdot 4H_2O$. | 50 ml. of 1, 5, 10 and 15 vol. percent $HNO_3$ then with 30 wt. percent $H_2SO_4$. |

The control electrodes were tested as anodes with $PbO_2$ as the cathode and as oxygen, cathodes with Pb as the anode, according to the procedures of Example 1. The results are listed below in Tables II and III.

It is clear from the tables that these results would not be obtained with platinum alone or with the second metal alone. It is the combination of the small amount of second metal with platinum in the final product that gives the highly beneficial results obtained.

TABLE II

| Current Density, Ma./Cm.$^2$ | Voltage of anodes vs. PbO$_2$, ethanol (55° C.) | | | | | |
|---|---|---|---|---|---|---|
| | Control | Ni | Fe-Ni | Co | Mn | Cu |
| 2 | 1.08 | 1.43 | 1.29 | 1.18 | 1.20 | 1.17 |
| 6 | 0.99 | 1.34 | 1.21 | 1.09 | 1.12 | 1.14 |
| 10 | 0.93 | 1.29 | 1.18 | 1.07 | 1.08 | 1.11 |
| 20 | 0.78 | 1.20 | 1.08 | 1.02 | 1.02 | 1.07 |
| 40 | 0.49 | 1.08 | 1.00 | 0.98 | 0.94 | 0.88 |

Analyses by Emission Spectroscopy (Wt. Percent)

| | Control | Ni | Fe-Ni | Co | Mn | Cu |
|---|---|---|---|---|---|---|
| Platinum | ($^1$) | 1.06 | 0.95 | 1.24 | 1.05 | ($^1$) |
| Additive | | 0.69 | $^2$ 0.043 | 0.052 | $^5$ 0.17 | |
| Additive | | | $^3$ 0.034 | ($^4$) | | |

| Current Density, Ma./Cm.$^2$ | Voltage of anodes vs. PbO$_2$, ethylene fuel (55° C.) | | | | | |
|---|---|---|---|---|---|---|
| | Control | Ni | Fe-Ni | Co | Cu | Fe-Cu-Co |
| 2 | 0.89 | 1.05 | 1.27 | 0.99 | 1.04 | 1.12 |
| 6 | 0.72 | 0.95 | 1.20 | 0.85 | 0.93 | 1.02 |
| 10 | 0.62 | 0.89 | 1.14 | 0.72 | 0.87 | 0.95 |
| 20 | 0.33 | 0.73 | 0.95 | ------ | 0.82 | 0.83 |

Analyses by Emission Spectroscopy (Wt. Percent)

| | Control | Ni | Fe-Ni | Co | Cu | Fe-Cu-Co |
|---|---|---|---|---|---|---|
| Platinum | ($^1$) | 0.90 | 0.95 | 1.24 | ($^1$) | 0.85 |
| Additive | | $^2$ 0.16 | | | | $^3$ 0.14 |
| Additive | | | | | | $^6$ 0.043 |
| Additive | | | | | | $^4$ 0.0091 |

$^1$ Not run. $^2$ Ni. $^3$ Fe. $^4$ Co. $^5$ Mn. $^6$ Cu.

TABLE III

| Current Density, Ma./Cm.$^2$ | Voltage of cathodes vs. Pb with oxygen (55° C.) | | | | | | |
|---|---|---|---|---|---|---|---|
| | Control | Cu | Mn | Ni | Fe-Ni | Co | Cu-Ni-Mn | Fe |
| 2 | 1.02 | 1.30 | 1.28 | 1.28 | 1.26 | 1.25 | 1.27 | 1.27 |
| 6 | 0.93 | 1.24 | 1.24 | 1.22 | 1.21 | 1.20 | 1.22 | 1.20 |
| 10 | 0.86 | 1.22 | 1.20 | 1.20 | 1.18 | 1.17 | 1.19 | 1.14 |
| 20 | 0.72 | 1.18 | 1.15 | 1.14 | 1.14 | 1.11 | 1.11 | 1.06 |
| 40 | 0.48 | 1.13 | 1.10 | 1.08 | 1.07 | 1.06 | 1.00 | 0.92 |

Analyses by Emission Spectroscopy (Wt. Percent)

| | Control | Cu | Mn | Ni | Fe-Ni | Co | Cu-Ni-Mn | Fe |
|---|---|---|---|---|---|---|---|---|
| Pt | ($^1$) | 0.70 | 1.05 | 0.70 | 0.95 | 1.24 | ($^1$) | ($^1$) |
| Additive | | 0.061 | 0.17 | 0.11 | {$^2$0.034 / $^3$0.043} | 0.052 | | |

$^1$ Not run. $^2$ Fe. $^3$ Ni.

The above results in Tables II and III further demonstrate the superior results of the test electrodes. In all the tests, the electrode was superior to the control with both of the fuels and with oxygen. A comparison reveals the magnitude of these superior results with both single and mixed second metals.

It is readily noted that applicant has provided an especially effective electrode for fuel cells and provided a substantial contribution to the art.

Thus having described the invention, what is claimed is:

1. A process for preparing an improved platinum electrode, said process comprising: (1) impregnating an electrically conducting inert support with salts of platinum and a second metal to produce a codispersion of said salts, said second metal being selected from the group consisting of iron, nickel, cobalt, manganese, copper and combinations thereof, (2) drying said impregnated support, (3) treating said salts at a temperature of from 500° C. to 1500° C. in an inert atmosphere for a sufficient time to produce an intimate mixture composed of said platinum and said second metal, and (4) removing a major amount of said second metal to produce an increased internal surface area in said electrode which exposes increased amounts of said intimate mixture, said intimate mixture comprising from about 2 to about 300 atomic percent of said second metal based on said platinum.

2. The process of claim 1 wherein said temperature is about 1,000° C.

3. The process of claim 1 wherein said temperature is about 1000° C. and said time is about two hours.

4. The process of claim 1 wherein said codispersion contains about 1000 weight percent of said second metal based on said platinum.

5. A process for preparing an improved platinum electrode, which process comprises: (1) impregnating an electrically conducting inert support with salts of platinum and a second metal to produce a codispersion of said salts, said second metal being selected from the group consisting of iron, nickel, cobalt, manganese, copper and combinations thereof, (2) drying said impregnated support, (3) subjecting said salts to reducing conditions for a sufficient time to produce a reduction product, (4) subjecting said reduction product to a temperature of from 500° C. to 1500° C. in an inert atmosphere for a sufficient time to produce an intimate mixture composed of the metallic platinum and said second metal, and (5) removing a major amount of the second metal to produce an increased internal surface area in said electrode which exposes increased amounts of said intimate mixture, said intimate mixture comprising from about 2 to about 300 atomic percent of said second metal based on said platinum.

6. A process for preparing an improved platinum electrode which process comprises: (1) impregnating a porous electrically conducting inert support with salts of platinum and a second metal to produce a codispersion of said salts, said second metal being selected from a group consisting of iron, nickel, cobalt, manganese, copper and combinations thereof, (2) drying said impregnated support, (3) subjecting said codispersion to chemical reduction conditions for a sufficient time to produce a reduction product, (4) treating said reduction product to a temperature of from 500° C. to 1500° C. in an inert atmosphere for a sufficient time to produce an intimate mixture composed of the metallic platinum and said second metal, and (5) leaching a major amount of second metal to produce an increased surface area in said electrode which exposes increased amounts of said intimate mixture, said intimate mixture comprising from about 2 to about 300 atomic percent of said second metal based on said platinum.

7. The process of claim 6 wherein said salts are soluble in water, said reduction is carried out with oxalic acid, and said removal step is carried out with an oxidizing chemical.

8. The process of claim 7 wherein said oxidizing chemical is sulphuric acid.

References Cited
UNITED STATES PATENTS
| | | | |
|---|---|---|---|
| 3,212,930 | 10/1965 | Thompson et al. | 136—86 |
| 3,150,011 | 9/1964 | Winsel et al. | 136—86 |
| 3,160,527 | 12/1964 | Hess | 136—86 |

FOREIGN PATENTS
239,130  11/1956  Australia.

WINSTON A. DOUGLAS, *Primary Examiner.*
H. FEELEY, *Assistant Examiner.*

U.S. Cl. X.R.
136—86